(12) United States Patent
Sato et al.

(10) Patent No.: US 6,541,530 B2
(45) Date of Patent: Apr. 1, 2003

(54) URETHANE-MODIFIED POLYISOCYANURATE FOAM

(75) Inventors: Tsuyoshi Sato, Yokohama (JP); Tsutomu Nakamura, Yokohama (JP)

(73) Assignee: Hodogaya Chemical Co., Ltd., Kawasaki (JP)

( * ) Notice: Subject to any disclaimer, the term of this patent is extended or adjusted under 35 U.S.C. 154(b) by 0 days.

(21) Appl. No.: 09/989,410

(22) Filed: Nov. 27, 2001

(65) Prior Publication Data

US 2002/0099108 A1 Jul. 25, 2002

(30) Foreign Application Priority Data

Nov. 28, 2000 (JP) ........................................ 2000-361130

(51) Int. Cl.[7] .............................. C08J 9/08; B32B 3/26; B32B 27/40; B32B 27/42; B32B 27/28
(52) U.S. Cl. ................. 521/110; 428/304.4; 428/319.1; 428/422.8; 521/112; 521/130; 521/136; 521/137; 521/902
(58) Field of Search ................................. 521/110, 130, 521/136, 137, 112, 902; 428/304.4, 319.1, 422.8

(56) References Cited

U.S. PATENT DOCUMENTS

| | | | | |
|---|---|---|---|---|
| 3,948,824 A | * | 4/1976 | Robins | 521/171 |
| 4,390,641 A | * | 6/1983 | Smith | 521/103 |
| 4,390,642 A | * | 6/1983 | Smith | 521/112 |
| 4,473,669 A | | 9/1984 | Rupert et al. | 521/177 |
| 4,555,530 A | * | 11/1985 | Patton, Jr. et al. | 521/131 |

OTHER PUBLICATIONS

Derwent Publications, JP 2001–240649, Sep. 4, 2001.

Patent Abstracts of Japan, JP 8–134169, May 28, 1996.

* cited by examiner

*Primary Examiner*—Rabon Sergent
(74) *Attorney, Agent, or Firm*—Oblon, Spivak, McClelland, Maier & Neustadt, P.C.

(57) ABSTRACT

A urethane-modified polyisocyanurate foam obtained by reacting (A) a polyisocyanate compound component, (B) a polyol component, containing a modified phenolic resin obtained by adding 20 to 100 parts by weight of a polyhydric alcohol or its alkylene oxide adduct to 100 parts by weight of a benzylic ether type phenolic resin and heating under a reduced pressure, in an amount of at least 3 wt % to the total resin component, (C) water and (D) a foam stabilizer comprising a mixture of at least 2 silicone type surfactants having different surface tensions wherein a surfactant having a higher surface tension has a surface tension of higher than 22 dyne/cm and a surfactant having a lower surface tension has a surface tension of at most 22 dyne/cm, in the presence of (E) a urethane-forming catalyst and/or a trimerization catalyst.

8 Claims, No Drawings

URETHANE-MODIFIED POLYISOCYANURATE FOAM

The present invention relates to a urethane-modified polyisocyanurate foam having a high expansion rate, which is excellent in flame retardancy and heat resistance, and is low in smoke generation, without using chlorofluorocarbons (CFCs) or hydrochlorofluorocarbons (HCFCs) as a blowing agent.

In the polyurethane and polyisocyanurate industries, because of a problem of depleting the ozone layer, use of CFCs, which had been used as versatile and effective blowing agents, has been banned since 1995, and further, even HCFCs, substitutes for CFCs, having much lower ozone depletion potential, are scheduled to be banned from the year of 2003. Hence, a variety of alternative blowing agents, such as hydrofluorocarbons (HFC), hydrocarbons (HC), carbon dioxide ($CO_2$), etc. are being studied.

It is said lately that HCFC blowing is being replaced by the $CO_2$ blowing for the polyurethane foam (PUR system) for insulated metal sidings or panels, and that the replacement has been almost completed.

However, in the case of the polyisocyanurate foam (PIR system), which is rated high for the flame retardancy and heat resistance, when the $CO_2$ blowing method is applied, there are specific problems of lower than typical flame retardancy, heat resistance and shrinkage (deformation) with time, in addition to a problem of unsatisfactory adhesion to a facing material, not allowing the replacement of the conventional blowing method by the $CO_2$ blowing to develop as successfully as in the case of PUR systems.

In the $CO_2$ blowing method, it is generally said that a foam causes shrinkage (deformation) with time. This is because of the rapid diffusion of $CO_2$ from the foam cells.

In the field of insulated metal sidings or panels cored with the PUR system, the replacement by the $CO_2$ blowing method has been almost completed by lowering a closed cell ratio as a means for preventing shrinkage (deformation) with time. For example, by employing a combination of a high molecular polyol and a low molecular polyol, the resulting foam becomes rich with open cells and, because of its low density, does not cause shrinkage.

In the field of insulated metal sidings or panels cored with the PIR system, a foam having an open cell structure can be obtained to prevent shrinkage (deformation) by employing a method of using certain aromatic polyester polyols (JP-A-10-231345), and a method of producing a foam of relatively low density by using a trimerization catalyst and a carbodiimide-forming catalyst in combination (Japanese Patent No. 2,972,523), but there are problems of lowering flame retardancy, heat resistance and a poor adhesion to a facing material, and it is therefore difficult to use the $CO_2$ blowing as a substitute for the conventional blowing methods.

In order to solve the above-mentioned problems of a PIR type foam employing a $CO_2$ blowing agent, it is necessary not only to make a foam having a continuous cell phase (open cells) for improving the shrinkage problem but also to solve the above-mentioned problems concerning flame retardancy and heat resistance.

In order to solve the above-mentioned problems, the present inventors have discovered a novel method not only for freely controlling a cell size but also for improving flame retardancy and heat resistance by applying a benzylic ether type phenolic resin (hereinafter referred to as "BEP") to the PIR system.

Particularly, flame retardancy and heat resistance are improved by employing BEP as a polyol component and a cell size is controlled by mixing surfactants, having different properties, at an appropriate ratio. For example, a silicone type surfactant is used as a foam stabilizer (1) and a dimethylsilicone oil is used as a foam stabilizer (2).

More particularly, the present invention provides a urethane-modified polyisocyanurate foam obtained by reacting (A) a polyisocyanate compound component, (B) a polyol component (said polyol component contains a modified phenolic resin (hereinafter referred to as "modified BEP") obtained by adding 20 to 100 parts by weight of a polyhydric alcohol or its alkylene oxide adduct to 100 parts by weight of a benzylic ether type phenolic resin and heating under a reduced pressure, in an amount of at least 3 wt % to the total resin component), (C) water and (D) a foam stabilizer comprising a mixture of at least 2 silicone type surfactants having different surface tensions wherein a surfactant having a higher surface tension has a surface tension of higher than 22 dyne/cm and a surfactant having a lower surface tension has a surface tension of at most 22 dyne/cm, in the presence of (E) a urethane-forming catalyst and/or a trimerization catalyst.

The polyol component (B) used in the present invention is a mixture of modified BEP and a polyol generally used for producing a urethane foam. Thus, the polyol component (B) comprises mainly modified BEP by adding 20 to 100 parts by weight of a polyhydric alcohol or its alkylene oxide adduct to 100 parts by weight of a benzylic ether type phenolic resin and heating the mixture under a reduced pressure, as described in JP-B-7-30155. Examples of other polyols usable with the modified BEP include difunctional polyols such as ethylene glycol, diethylene glycol, polyethylene glycol, propylene glycol, dipropylene glycol, polypropylene glycol, polytetramethylene glycol, 1,4-butanediol or these difunctional polyols addition-polymerized with one or two or more kinds of alkylene oxides, trifunctional polyols such as trimethylolpropane, glycerin or these trifunctional polyols addition-polymerized with alkylene oxides, polyfunctional polyols such as pentaerythritol, sorbitol, sugar or these polyfunctional polyols addition-polymerized with an alkylene oxide, an aromatic polyester polyol, an acryl polyol resin, and the like, and these polyols may be used alone or may be used in a mixture of two or more polyols. The modified BEP is used suitably in an amount of at least 3.0 wt to the total resin component. If the amount of the modified BEP is less than 3.0 wt %, flame retardancy, heat resistance and low smoking property become poor.

A polyisocyanate compound (A) used in the present invention is not specially limited and may be ones generally used in the preparation of a polyurethane foam, examples of which include m- or p-phenylene diisocyanate, p-xylene diisocyanate, ethylene diisocyanate, tetramethylene 1,4-diisocyanate, hexamethylene-1,6-diisocyanate, diphenylmethane-4,4'-diisocyanate, 3,3'-dimethyldiphenylmethane-4,4'-diisocyanate, 3,3-dichloro-4,4'-biphenylene diisocyanate or 1,5-naphthalene diisocyanate, 2,4- and 2,6-tolylene diisocyanate and their mixture, crude tolylene diisocyanate, 4,4'-diphenylmethane diisocyanate, crude diphenylmethane diisocyanate, and the like. These isocyanate compounds may be used alone or in a mixture of two or more. Its amount used is an equivalent ratio of an isocyanate group/active hydrogen in a polyol component mixture solution in a range of from 1.05 to 5.0, preferably from 1.50 to 3.0. If the above equivalent ratio is less than 1.05, flame retardancy, heat resistance and low smoking property become poor, and if the equivalent ratio is more than 5.0, a foam produced becomes brittle and adhesiveness to a facing material becomes poor.

A foam stabilizer used in the present invention is a mixture of at least two kinds of silicone type surfactants having different surface tensions, and a component having a higher surface tension has a surface tension higher than 22 dyne/cm. A foam stabilizer generally used in the preparation of a urethane foam may be used, preferable example of which include an organic polysiloxane copolymer, a polydimethylsiloxane-polyalkylene oxide adduct, a vinylsilane-polyoxyalkylene polyol compound and the like. A component having a lower surface tension has a surface tension lower than 22 dyne/cm, preferable examples of which include a dimethylsilicone oil.

Examples of the organic polysiloxane copolymer include SH-190, SH-192, SH-193, SH-194, M505, M507, M509 and SRX253 manufactured by Toray Silicone K.K., L-520, L-540, L-580, L-582, L-5340, L-5410, L-5420, L-5470 and SZ-1127 manufactured by UNICAR CO., LTD., TFA-4200, TFA-4205 and TFA-7241 manufactured by Toshiba Silicone K.K., and B-8404 and B-8017 manufactured by GOLD-SCHMIDT K.K.

Examples of the dimethylsilicone oil include SH-200 manufactured by Toray Silicone K.K., and TSF-451-5, TSF451-50 and TSF405 manufactured by Toshiba Silicone K.K.

A suitable mixing ratio of a component having a higher surface tension/a component having a lower surface tension is 100 parts by weight/0.5–50 parts by weight. If the amount of the component having a lower surface tension is less than 0.5 part by weight, the aimed effect of the present invention can not be achieved, and shrinkage is caused. On the other hand, if the amount of the component having a lower surface tension is more than 50 parts by weight, a foam-breaking effect becomes large and a satisfactory foam can not be obtained. A foam stabilizer (D) comprising a mixture of at least two kinds of silicone type surfactants having different surface tensions is used preferably in an amount of from 0.5 to 10 parts by weight to 100 parts by weight of a polyol component (B).

A catalyst used for carrying out urethane-foaming reaction may be ones generally known as a urethane-foaming catalyst, examples of which include N,N,N',N'-tetramethylethylenediamine, N,N,N',N'-tetramethylpropane-1,3-diamine, N,N,N',N'-tetramethylhexene-1,6-diamine, N,N,N',N",N"-pentamethyldiethylenetriamine, N,N-dicylcohexylmethylamine, bis(N,N-dimethylaminoethylpiperazyl)ethane, N,N',N"-tris(diethylaminopropyl)hexahydrotriazine and other tertiary amine, and dibutyltin dilaurate, dibutyltin diacetate, and the like. These catalysts may be used alone or in a mixture thereof.

An isocyanate trimerization catalyst used in the present invention may be a trimerization catalyst for isocyanates used in the preparation of a conventional polyisocyanurate resin. Examples of the isocyanate trimerization catalyst include an organic metal salt system such as potassium acetate, potassium octenate, iron oxalate or the like, a tertiary amine salt such as 2,4,6-tris(dimethylaminomethyl)phenol, N,N',N"-tris(dimethylaminopropyl)hexahydrotriazine or the like.

An urethane-foaming catalyst and a trimerization catalyst (E) are used in an amount of from 0.3 to 15 parts by weight, preferably from 0.70 to 10 parts by weight to 100 parts by weight of a polyol component (B).

Water (C) used in the present invention reacts with a polyisocyanate compound to produce carbon dioxide and works as a foaming agent. An amount of water is determined depending on an aimed density of a foam, and is suitably from 2 to 30 parts by weight to 100 parts by weight of a polyol component (B). If the amount of water is less than 2 parts by weight, a density of a foam becomes too high, and if the amount of water exceeds 30 parts by weight, a mechanical strength becomes too low for practical use.

In the present invention, if necessary, a crosslinking agent and a viscosity-reducing agent may be used. Examples of the crosslinking agent include ethylene glycol, propylene glycol, 1,4-butanediol, 1,6-hexanediol, diethylene glycol, triethylene glycol, triethanolamine, ethylenediamine or the like, and they may be used alone or in a combination of two or more. Examples of the viscosity-reducing agent include nitrogen-containing type, sulfur-containing type, phosphorus type, ether type, hydrocarbon type, ester type or carbonate type organic compounds which are liquid at normal temperature, and they may be used alone or in a combination of two or more. These additives and other additives may be previously mixed with a mixture containing a polyol component (B) or may be added thereto at the time of reacting.

In the production of a polyisocyanurate foam of the present invention, a high pressure foaming machine, a medium pressure foaming machine or a low pressure foaming machine is used to produce a board, a panel or a siding in a factory or to carry out in-situ foaming.

EXAMPLES

Hereinafter, the present invention is concretely illustrated with reference to Examples and Comparative Examples.

Starting materials employed, measurement methods and preparation methods of samples in the Examples and Comparative Examples are illustrated below, and "%" is based on weight.

A density was measured in accordance with JISA-9511.

A closed cell foam ratio was measured in accordance with ASTM-DT2856.

A flame retardancy test was carried out by employing a surface test with a Flammability Tester of Toyo Seiki Seisakusho, in accordance with JIS A-1321.

In the following Examples and Comparative Examples, such compositions as shown in the following Table 1 were mixed and stirred at 4,000 rpm in a laboratory mixer, and a foam was produced by using an aluminum-made box.

A foam was obtained by subjecting the mixture to free-foaming in an aluminum-made box of 250 mm×250 mm×250 mm heated at 40° C. A core part of the free-foamed foam was taken by cutting and was subjected to a test.

Starting materials employed were as follows.

Modified BEP: Modified phenolic resin (BEP2100M manufactured by Hodogaya Chemical Co., Ltd.)

Other polyol 1: Aromatic polyester polyol (PL-135, OH value 200, manufatured by Toho Rika K.K.)

Other polyol 2: Glycerine polyether polyol (MF-78, OH value 35, manufatured by Takeda Chemical Industries, Ltd.)

TEP: Triethyl phosphate (flame retardant manufactured by Bayer Ltd.)

Trimerization catalyst: Potassium octenate (manufactured by PELRON Co.)

Foam stabilizer (1): Organic polysiloxane copolymer (SH-190, surface tension 23.5 dyne/cm, manufactured by Toray Silicone K.K.)

Foam stabilizer (2): Dimethylsilicone oil (TSF-451-100, surface tension 20.8 dyne/cm, manufactured by Toshiba Silicone K.K.)

Isocyanate compound: Crude diphenylmethane diisocyanate (MR-100, NCO content 31.0%, manufactured by Nippon Polyurethane Industry Co., Ltd.)

EXAMPLE 1

Predetermined compositions as shown in the following Table 1 were prepared, and foams were produced in accordance with the predetermined method, and densities and closed cell foam ratios were measured. Compositions A-1 to A-3 were different only in respect of a blending ratio of the foam stabilizers (2), and respective weight ratios of the foam stabilizer (2) to the total amount were 0.03%, 0.06% and 0.12%.

Compositions and physical properties are shown in the following Table 1.

As evident from the test results as shown in the following Table 1, it was proved that a high extent of foaming could be achieved, and a closed cell foam ratio could be controlled by varying a kind and a blending ratio of foam stabilizers, whereby an excellent dimensional stability could be obtained.

As evident from the test results as shown in the following Table 2, it was proved that the test sample was satisfactorily stable (excellent in thickness change rate) both at a high temperature and at a low temperature, and was satisfactory for practical use.

TABLE 2

(Time variability test)

| Composition A-2 of Example 1 of present invention | Thickness change rate (%) Days lapsed | | | |
|---|---|---|---|---|
| | 5 days | 10 days | 20 days | 30 days |
| 80° C. | −0.2 | −0.3 | −0.3 | −0.3 |
| −20° C. | 0.1 | 0.2 | 0.2 | 0.2 |

EXAMPLE 3

In order to prove a heat resistance effect of the present invention, a heat resistance test was carried out to measure

TABLE 1

(Compositions and physical property measuring results)

| Components | Starting materials used | | Examples (Compositions of present invention) | | | | Comparative Examples | | |
|---|---|---|---|---|---|---|---|---|---|
| | | | A-1 | A-2 | A-3 | A-4 | Conventional product | B-1 | B-2 |
| B | Modified BEP | | 15.8 | 15.8 | 15.8 | 15.0 | — | 15.8 | 15.8 |
| | Other polyol 1 | | 31.6 | 31.6 | 31.6 | 30.1 | 57.6 | 31.6 | 31.6 |
| | Other polyol 2 | | 31.6 | 31.6 | 31.6 | 30.1 | 14.3 | 31.6 | 31.6 |
| | TEP | | 11.8 | 11.8 | 11.8 | 11.2 | 18.0 | 11.8 | 11.8 |
| E | Trimerization catalyst | | 3.1 | 3.1 | 3.1 | 3.0 | 2.9 | 3.1 | 3.1 |
| D | Foam stabilizer (1) | | 1.1 | 1.1 | 1.1 | 1.0 | 2.9 | 1.2 | — |
| | Foam stabilizer (2) | | 0.1 | 0.2 | 0.4 | 0.2 | — | — | 1.2 |
| C | Water | | 4.8 | 4.8 | 4.8 | 9.5 | 4.9 | 4.8 | 4.8 |
| A | Isocyanate | | 221.0 | 221.0 | 221.0 | 406.0 | 183.0 | 221.0 | 221.0 |
| | NCO/OH equivalent ratio | | 1.9 | 1.9 | 1.9 | 1.9 | 1.9 | 1.9 | 1.9 |
| | Foam density (kg/m³) | | 26.5 | 27.1 | 27.8 | 18.3 | 35.0 | 23.6 | — |
| | Closed cell foam ratio (%) | | 50 | 15 | 0 | 15 | 98 | 98 | — |
| | Dimensional stability ($\Delta V$) | 80° C. × 48 H | −0.3 | −0.1 | −0.2 | −0.5 | −15 | Large shrinkage at room temp. | Foam was not formed. |
| | | −20° C. × 48 H | 0.5 | 0 | 0 | 1.2 | −11 | | |
| | | 70° C. × 95% RH × 48 H | −1.5 | −0.8 | −0.5 | −0.9 | −18 | | |

RH represents relative humidity.

EXAMPLE 2

A test sample of 200 mm×100 mm×25 mm panel was prepared by using composition A-2 of Example 1 and a colored galvanized steel sheets having a thickness of 0.35 mm as facing materials on both sides, and the test sample thus prepared was subjected to a time variability test under severe conditions as shown in Table 2, and the results are shown in Table 2.

a volume change rate, and the results are shown in the following Table 3.

A test sample was prepared by using composition A-2 of Example 1 in accordance with a predetermined method.

As evident from the test results as shown in the following Table 3, the heat resistance effect achieved by adding modified BEP became remarkable under high temperature conditions.

TABLE 3

(Heat resistance test)

Volume change rate (%)
Test conditions

| Sample foams | 90° C. × 48 H | 150° C. × 48 H | 200° C. × 2 H | 250° C. × 2 H |
|---|---|---|---|---|
| Composition A-2 of Example 1 of present invention | −0.6 | −3.3 | −1.5 | −7.5 |
| General-purpose PIR (Comparative Example to Example 1) | −1.0 | −3.9 | −3.3 | −13.2 |

EXAMPLE 4

A flame retardancy test was carried out, and the test results are shown in the following Table 4.

A test sample of 220 mm×220 mm×25 mm was prepared from a foam obtained by using composition A-2 of Example 1 in accordance with a predetermined method.

As evident from the test results as shown in the following Table 4, it was proved that the aimed effect of the present invention could be achieved also in respect of flame retardancy.

TABLE 4

(Flame retardancy test)

| | CA | T · d θ | After-flame (sec) | Acceptance or rejection |
|---|---|---|---|---|
| Composition A-2 of Example 1 of present invention | 41 | 75 | 0 | Acceptance |
| JISA-1321 Flame retardant rating 2 | At most 60 | At most 100 | At most 30 | |

CA represents a smoking coefficient, and T · d θ represents a coefficient of temperature · time · area.

EXAMPLE 5

A product of the present invention and a conventional typical product blown by an HCFC were compared in respect of board physical properties, a flame retardancy test and an asphalt test, and the results are shown in the following Table 5. A test sample of a board of the present invention was prepared by using composition A-1 of Example 1.

As evident from the test results as shown in the following Table 5, the test sample obtained by using a $CO_2$ foaming agent in accordance with the present invention was proved to be in no way inferior to the conventional product obtained by the using flon foaming agent, and was satisfactory for practical use, and was proved to provide excellent performances as a heat-insulating board for a water-proofing system.

TABLE 5

(Physical properties of board)
Flame retardancy test was carried out
in accordance with JIS A-9511.
Dimensional stability was expressed by change rates.
Composition A-1 of Example 1

| | | Products of present invention | | HCFC-blown conventional products | |
|---|---|---|---|---|---|
| Board thickness (mm) | | 25 | 50 | 25 | 50 |
| Density (kg/m³): | | | | | |
| Entire core | | 52.2 | 40.8 | 57.1 | 42.1 |
| A central part of core | | 41.3 | 30.1 | 40.0 | 27.3 |
| Compression strength (kg/cm²) | | 1.9 | 1.6 | 2.3 | 1.6 |
| Closed cell foam ratio % | | 55 | 45 | 80 | 75 |
| Dimensional stability | Wet heat property (70° C., 95%, 48 H) | | | | |
| | Length | −0.1 | 0 | 3.2 | 2.5 |
| | Breadth | 0 | −0.4 | 3.3 | 2.2 |
| | Thickness | 1.4 | 1.2 | 0.4 | 0.1 |
| | Heat resistance (80° C., 48 H) | | | | |
| | Length | −0.1 | 0.2 | 1.2 | 0.5 |
| | Breadth | 0.2 | 0 | 1.0 | 0.2 |
| | Thickness | 0.5 | 0.2 | −0.4 | −0.5 |
| | Low-temperature resistance (−20° C., 48 H) | | | | |
| | Length | 0 | 0.2 | −0.1 | −0.1 |
| | Breadth | 0 | 0 | 0.1 | 0 |
| | Thickness | 0.1 | 0.1 | 0.1 | 0.1 |
| Water absorption (g/100 cm²) | | 0.6 | 0.4 | 0.7 | 1.4 |
| Flame retardancy | Flame-out time (sec) | 0–24 | 2–28 | 0–56 | 2–52 |
| | Burned distance (mm) | 10–30 | 13–28 | 23–52 | 18–48 |
| | Acceptance or Rejection | A | A | A | A |
| Asphalt test (250° C., 5 sec) | | | | | |
| Length | | 0 | 0 | 0 | 0 |
| Breadth | | 0 | 0 | 0 | 0 |

A: Acceptance

EXAMPLE 6

The aimed effect of the present invention was studied with regard to a dimensional stability test and a flammability test. The test results are shown in the following Table 6.

A test sample of a siding having a structure comprising an aluminum foil 20 μ, a PIR foam 9 mm and a colored aluminum plate 0.35 mm was prepared in a continuous line.

As evident from the test results as shown in the following Table 6, it was proved that the aimed effect of the present invention was achieved also in respect of the test of siding. Also, it was proved that the product of the present invention meets the Class 2 non-flammability requirements in JIS A-1321, thereby fully proving itself to be practically usable.

TABLE 6

(Physical property measuring results of siding)

| 1) Dimensional stability test | Thickness change ratio % | | |
|---|---|---|---|
| Test conditions | 80° C., 48 H | 70° C., 95% RH, 48 H | −20° C., 48 H |
| Composition A-3 of Example 1 | −0.4 | 0.3 | 0.1 |

TABLE 6-continued (Physical property measuring results of siding)

2) Flammability test
JIS A-1321 Boring test Flame retardancy rating 2

| | CA | T · d θ | After-flame (sec) | Acceptance or rejection |
|---|---|---|---|---|
| Composition A-3 of Example 1 | 33 | 20 | 9 | Acceptance |

As mentioned above, the present invention provides a satisfactory urethane-modified polyisocyanurate foam (PIR system) without using a CFC foaming agent or HCFC, which has a low shrinkage, a low density and satisfactory properties in respect of flame retardancy, heat resistance, adhesiveness and reactivity.

The entire disclosure of Japanese Patent Application No. 2000-361130 filed on Nov. 28, 2000 including specification, claims and summary are incorporated herein by reference in its entirety.

What is claimed is:

1. An urethane-modified polyisocyanurate foam obtained by reacting (A) a polyisocyanate compound component, (B) a polyol component comprising a modified phenolic resin obtained by adding 20 to 100 parts by weight of a polyhydric alcohol or its alkylene oxide adduct to 100 parts by weight of a benzylic ether phenolic resin and heating under a reduced pressure, said modified phenolic resin being present in an amount of at least 3 wt % to the total resin component (B), (C) water and (D) a foam stabilizer comprising a mixture of at least 2 silicone surfactants having different surface tensions wherein a surfactant having a higher surface tension has a surface tension of higher than 22 dyne/cm and a surfactant having a lower surface tension has a surface tension of at most 22 dyne/cm, in the presence of (E) a urethane-forming catalyst and/or a trimerization catalyst.

2. The urethane-modified polyisocyanurate foam described in claim 1, having a density of from 15 kg/m$^3$ to 50 kg/m$^3$.

3. A heat-insulating board for a water-proof roofing system comprising the urethane-modified polyurethane foam described in claim 1.

4. A heat-insulating board for a water-proof roofing system comprising the urethane-modified polyurethane foam described in claim 2.

5. A composite panel comprising the urethane-modified polyisocyanurate foam described in claim 1 and a core material.

6. A composite panel comprising the urethane-modified polyisocyanurate foam described in claim 2 and a core material.

7. A composite metal siding comprising the urethane-modified polyisocyanurate foam described in claim 1 and a core material.

8. A composite metal siding comprising the urethane-modified polyisocyanurate foam described in claim 2 and a core material.

* * * * *